(12) United States Patent
Zhang

(10) Patent No.: US 8,000,112 B2
(45) Date of Patent: Aug. 16, 2011

(54) ACTIVE SNUBBER FOR TRANSITION MODE POWER CONVERTER

(75) Inventor: Xiaoyang Zhang, Richardson, TX (US)

(73) Assignee: Flextronics AP, LLC, Broomfield, CO (US)

( * ) Notice: Subject to any disclaimer, the term of this patent is extended or adjusted under 35 U.S.C. 154(b) by 699 days.

(21) Appl. No.: 12/101,700

(22) Filed: Apr. 11, 2008

(65) Prior Publication Data

US 2009/0257255 A1 Oct. 15, 2009

(51) Int. Cl.
*H02M 3/335* (2006.01)
(52) U.S. Cl. .................................... 363/21.01
(58) Field of Classification Search ............ 363/18, 363/20, 21.01, 39, 40, 131
See application file for complete search history.

(56) References Cited

U.S. PATENT DOCUMENTS

| | | | |
|---|---|---|---|
| 4,268,898 A | 5/1981 | Brown | |
| 4,561,046 A | 12/1985 | Kuster | |
| 4,607,322 A | 8/1986 | Henderson | |
| 4,675,796 A | 6/1987 | Gautherin et al. | |
| 4,772,810 A | 9/1988 | Felps | |
| 5,579,215 A | 11/1996 | Turuta | |
| 5,726,869 A * | 3/1998 | Yamashita et al. | 363/21.06 |
| 5,883,795 A | 3/1999 | Farrington | |
| 5,995,385 A | 11/1999 | Shimamura | |
| 6,005,782 A | 12/1999 | Jain et al. | |
| 6,081,077 A * | 6/2000 | Canova et al. | 315/307 |
| 6,314,002 B1 | 11/2001 | Qian et al. | |
| 6,421,255 B1 | 7/2002 | Frebel et al. | |
| 6,473,318 B1 | 10/2002 | Qian et al. | |
| 6,947,297 B2 * | 9/2005 | Ke et al. | 363/20 |
| 7,012,817 B2 | 3/2006 | Liu et al. | |
| 7,130,204 B2 * | 10/2006 | Tsuruya | 363/56.12 |
| 2007/0263415 A1 | 11/2007 | Jansen et al. | |
| 2009/0027924 A1 * | 1/2009 | Inukai et al. | 363/21.09 |

FOREIGN PATENT DOCUMENTS

JP 1117653 5/1989

* cited by examiner

*Primary Examiner* — Adolf Berhane
(74) *Attorney, Agent, or Firm* — Per H. Larsen; Robert G. Crouch; Marsh Fischmann & Breyfogle LLP

(57) ABSTRACT

A transition mode power converter having an active snubber the operation of which is controlled using an auxiliary winding on the transformer of the power converter. In one embodiment, the power converter includes a transformer having a primary winding connected to a voltage source, a primary switch, an auxiliary switch, a capacitor, and an auxiliary winding on the transformer. The primary switch includes a first terminal connected to the primary winding of the transformer and a second terminal connected to a common node. The auxiliary switch includes a first terminal connected to the voltage source and to the primary winding. The capacitor is connected between a second terminal of the auxiliary switch and the first terminal of the primary switch. The auxiliary winding of the transformer is connected to a third terminal of the auxiliary switch and controls operation of the auxiliary switch via the third terminal.

31 Claims, 2 Drawing Sheets

ACTIVE SNUBBER FOR TRANSITION MODE POWER CONVERTER

FIELD OF THE INVENTION

The present invention relates generally to power converters, and more particularly to transition mode power converters, in some cases also referred to as critical conduction mode, or boundary mode converters.

BACKGROUND OF THE INVENTION

One embodiment of a prior power converter 100 that may operate in transition mode is schematically depicted in FIG. 1. In this regard, transition mode may be defined as a boundary mode between a discontinuous operating mode and continuous operating mode. The power converter 100 of FIG. 1 includes a transformer (T1) 110, two MOSFETS (M1, M2) 120 and 122, four diodes (D2, D4, D5, D6) 130-136, three capacitors (C3, C4, C5) 140-144, and a resistor (R5) 152. The power converter 100 is shown connected to a direct current voltage source 160. The transformer 110 includes primary and secondary windings (T1-1, T1-2) 110A and 110B. The MOSFETS (M1, M2) 120 and 122 may be referred to herein as the primary MOSFET (M1) 120 and the auxiliary MOSFET (M2) 122. In FIG. 1, parasitic capacitances and inherent body diode characteristics of the primary and auxiliary MOSFETS (M1, M2) 120 and 122 are not illustrated. Diodes (D4, D5, D6) 132-136 and capacitor (C5) 144 together comprise driving circuitry for auxiliary MOSFET (M2) 122 to control switching of auxiliary MOSFET (M2) 122 between an on and an off state, preferably under substantially Zero Voltage Switching (ZVS) conditions. Rectifier diode (D2) 130 and smoothing capacitor (C3) 140 together comprise secondary side rectification means.

As depicted in FIG. 1, the prior transition mode power converter 100 technology has external capacitor (C5) 144 and switch diode (D4) 132 arranged in series with the gate input capacitance of auxiliary MOSFET (M2) 122. This serial combination (C5, D4, M2 gate input capacitance) is in parallel with snubber capacitor (C4) 142 to divide the high voltage on snubber capacitor (C4) 142 into a certain level of voltage to safely drive the gate of auxiliary MOSFET (M2) 122 to an on state. MOSFET (M2) 122 can be turned off when the voltage across snubber capacitor (C4) 142 drops to zero using the other two switch diodes (D5 and D6) 134 and 136.

The divider circuit used in the prior transition mode power converter of FIG. 1 is subject to the tolerance of auxiliary MOSFET (M2)'s 122 gate input capacitance, which usually is not clearly defined and can vary by drain-source voltage as well as lot by lot and vendor by vendor. Additionally, the voltage on snubber capacitor (C4) 142 can vary significantly with the output load and the input line voltage as well. Thus, the auxiliary MOSFET (M2)'s 122 gate voltage level can have significant variation, especially if the output load range is large. Considerations such as these can make the prior power converter 100 of FIG. 1 less desirable for higher power applications.

SUMMARY OF THE INVENTION

Accordingly, the present invention provides a transition mode power converter that is well suited for a number of applications including for high power applications. The transition mode power converter includes active snubber circuitry. The active snubber may also be referred to as a switch mode snubber. The active snubber is used on the transition mode power converter to absorb the energy in the leakage inductance from the transformer, as well as any stray inductance. The active snubber will then transform the absorbed energy to the secondary side of the converter, and also use part of that energy to help the primary switch to achieve ZVS and eliminate turn on switching loss. This increases the converter efficiency and enables higher switching frequency operation. This also reduces the switching noise that is associated with the switch on and switch off, and thus reduces the EMI signature of the power converter. The present inventor has recognized that how to control the auxiliary switch that controls the on/off of the active snubber, including the right timing and right gate voltage level for the auxiliary switch, are issues of significance. The present invention addresses these issues in a simple and low cost way by controlling operation of the auxiliary switch with an auxiliary winding on the transformer.

In one aspect, a power converter includes a transformer having a primary winding connected to a voltage source, a primary switch, an auxiliary switch, a snubber capacitor, and an auxiliary winding on the transformer. The primary and/or auxiliary switches may, for example, be transistors such as, for example, MOSFETs, BJTs, IGBTs, and/or ESBTs. The primary switch includes a first terminal connected to the primary winding of the transformer and a second terminal connected to a common node. The auxiliary switch includes a first terminal connected to the voltage source and to the primary winding. The snubber capacitor is connected between a second terminal of the auxiliary switch and the first terminal of the primary switch. The auxiliary winding of the transformer is connected to a third terminal of the auxiliary switch and controls operation of the auxiliary switch via the third terminal. The power converter may also include a clamping circuit connected to the third terminal of the auxiliary switch. The clamping circuit may, for example, comprise a diode (e.g. a zener diode) connected in series with the auxiliary winding between the auxiliary winding and the second terminal of the auxiliary switch along with a resistor connected in parallel with the series combination of the auxiliary winding and the diode across the second and third terminals of the auxiliary switch.

In other embodiments, the location of on or more of the components within the power converter may be altered. For example, the locations of the snubber capacitor and the auxiliary switch can be switched. In this regard, various components (e.g., auxiliary winding, zener diode, resistor) associated with controlling switching operation of the auxiliary switch move with the auxiliary switch.

In another aspect, a power converter includes transforming means for transforming an input voltage level from a voltage source to a different output voltage level, the transforming means including a primary side connected to the voltage source and an auxiliary side. The power converter also includes primary switching means for switching between an on and an off state, the primary switching means having first, second and third terminals where the first terminal thereof is connected to the primary side of the transforming means and the second terminal thereof is connected to a common node. The power converter also includes auxiliary switching means for switching between an on and an off state, the auxiliary switching means having first, second and third terminals where the first terminal thereof is connected to the voltage source and to the primary side of the transforming means and where the third terminal thereof is connected to the auxiliary side of the transforming means. The power converter also includes charge storing means connected between the second terminal of the auxiliary switching means and the first terminal of the primary switching means. In the power converter, a reflected voltage in the auxiliary side of the transforming means controls switching of the auxiliary switching means between the on and off states thereof. If desired, the power converter may additionally include clamping means connected to the third terminal of the secondary switching means.

In one more aspect, an active snubber circuit is provided that may be incorporated in a power converter that includes a transformer and a primary switch, the transformer including at least a primary winding connected to a voltage source with the primary switch being connected to the primary winding. The power converter may, for example, comprise a flyback converter, a boost converter, a buck/boost converter. The active snubber circuit includes an auxiliary switch, a capacitor and an auxiliary winding on the transformer. In one embodiment, the auxiliary switch may be connected to the voltage source and the capacitor may be connected between the auxiliary switch and the primary switch. In another embodiment, the capacitor may be connected to the voltage source and the auxiliary switch may be connected between the capacitor and the primary switch. The auxiliary winding controls operation of the auxiliary switch between on and off states thereof. The primary and/or auxiliary switches may, for example, be transistors such as, for example, MOSFETs, BJTs, IGBTs, and/or ESBTs. If desired, the active snubber circuit may additionally include a clamping circuit connected to the auxiliary switch. The clamping circuit may, for example, comprise a diode (e.g., a zener diode) connected in series with the auxiliary winding and a resistor connected in parallel with the series combination of the auxiliary winding and the diode.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

Figure 2:
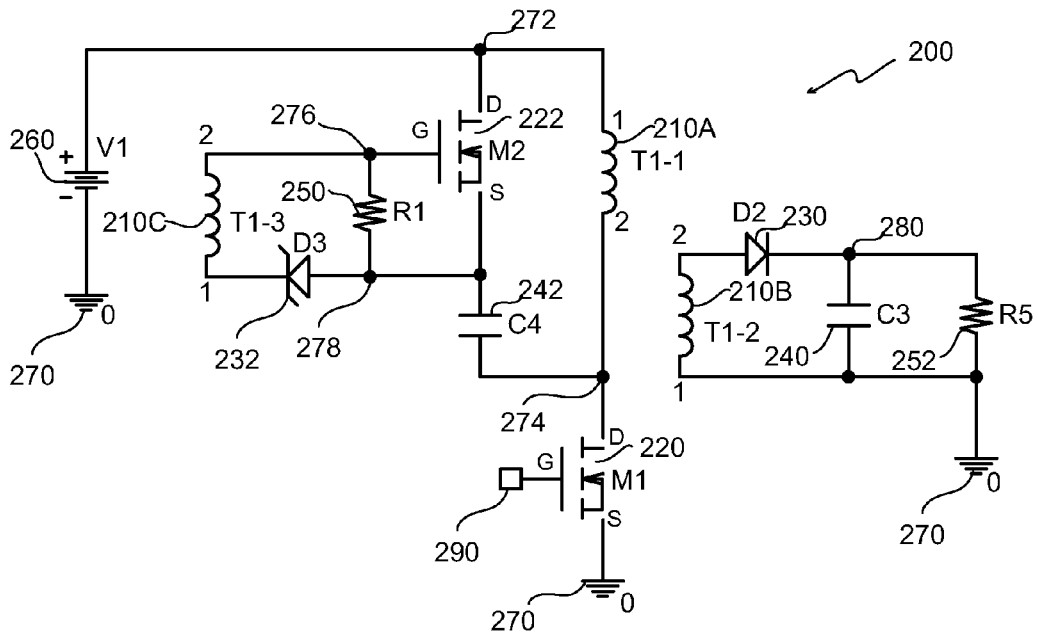
FIG. 2 is a schematic diagram of one embodiment of a transition mode power converter in accordance with the present invention.

FIG. 2 is a schematic diagram showing one embodiment of a transition mode power converter 200. The power converter 200 includes a transformer (T1) 210, two MOSFETS (M1, M2) 220 and 222, a diode (D2) 230, a zener diode (D3) 232, two capacitors (C3, C4) 240 and 242, and two resistors (R1, R5) 250 and 252. The power converter 200 is shown connected to a direct current voltage source 260. The transformer 210 includes primary and secondary windings (T1-1, T1-2) 210A and 210B and an auxiliary winding (T1-3) 210C.

The MOSFETS (M1, M2) 220 and 222 may be referred to herein as the primary MOSFET (M1) 220 and the auxiliary MOSFET (M2) 222. In FIG. 2, parasitic capacitances and inherent body diode characteristics of the primary and auxiliary MOSFETS (M1, M2) 220 and 222 are not illustrated. The primary MOSFET (M1) 220 may also be referred to herein as the primary switch and the auxiliary MOSFET (M2) 222 may also be referred to herein as the auxiliary switch. In this regard, the primary switch and the auxiliary switch may, in general, be any switching device having appropriate operational characteristics for use in the transition mode power converter 200 including, for example, various types transistors (e.g., MOSFETs as shown, BJTs, IGBTs, ESBTs or the like).

Voltage source 260 may be a number of items including, for example, an AC to DC converter, one or more batteries, one or more photovoltaic cells, a DC to DC converter, or any combination thereof.

On the primary winding side of power converter 200, voltage source (V1) 260 is connected between a common node 270 and at node 272 to the drain terminal of auxiliary MOSFET (M2) 222 and the primary winding (T1-1) 210A of transformer 210. Common node 270 may, for example, be a zero potential or ground node although common node 270 may also be at other potentials. The primary winding (T1-1) 210A of transformer 210 is connected at node 272 to voltage source 260 and the drain terminal of auxiliary MOSFET (M2) 222 and is connected at node 274 to capacitor (C4) 242 and the drain terminal of primary MOSFET (M1) 220. The auxiliary winding (T1-3) 210C of transformer 210 is connected to zener diode (D3) 232 and is connected at node 276 to resistor (R1) 250 and the gate terminal of auxiliary MOSFET (M2) 222. Zener diode 232 is connected to the auxiliary winding (T1-3) 210C of transformer 210 and is connected at node 278 to resistor (R1) 250, capacitor (C4) 242, and the source terminal of auxiliary MOSFET (M2) 222. Snubber capacitor (C4) 242 is connected at node 278 to zener diode 232, resistor (R1) 250, and the source terminal of auxiliary MOSFET (M2) 222 and is connected at node 274 to the primary winding (T1-1) 210A of transformer 210 and the drain terminal of primary MOSFET (M1) 220. Resistor (R1) is connected at node 276 to the auxiliary winding (T1-3) 210C of transformer 210 and the gate terminal of auxiliary MOSFET (M2) 222 and is connected at node 278 to zener diode (D3) 232, capacitor (C4) 242, and the source terminal of auxiliary MOSFET (M2) 222. The drain terminal of auxiliary MOSFET (M2) 222 is connected at node 272 to voltage source (V1) 260 and the primary winding (T1-1) 210A of transformer 210. The source terminal of auxiliary MOSFET (M2) 222 is connected at node 278 to zener diode 232, resistor 250 and capacitor 242. The gate terminal of auxiliary MOSFET (M2) 222 is connected at node 276 to resistor (R1) 250 and the auxiliary winding (T1-3) 210C of transformer 210. The drain terminal of primary MOSFET (M1) 220 is connected at node 274 to capacitor (C4) 242 and the primary winding (T1-1) 210A of transformer 210. The source terminal of primary MOSFET (M1) 220 is connected to common node 270.

As shown in FIG. 2, the gate terminal of primary MOSFET (M1) 220 may be connected to a control circuit 290. Control circuit 290 controls switching of the primary switch to desirably achieve ZVS switching of the primary switch. In this regard, control circuit 290 may, for example, comprise an L6565 Quasi-Resonant SMPS Controller available from ST Microelectronics.

On the secondary winding side of power converter 200, the secondary winding (T1-2) 210B of transformer 210 is connected between diode (D2) 230 and common node 270. Diode (D2) 230 is connected to the secondary winding (T1-2) 210B of transformer 210 and is connected at node 280 to capacitor (C3) 240 and resistor (R5) 252. Capacitor (C3) 240 is connected to common node 270 and is connected at node 280 to diode (D2) 230 and resistor (R5) 252. Resistor (R5) 252 is connected to common node 270 and is connected at node 280 to capacitor (C3) 240 and diode (D2) 230. Although not shown in FIG. 2, the output of power converter 200 may be taken across the terminals of resistor (R5) 252.

Figure 1:
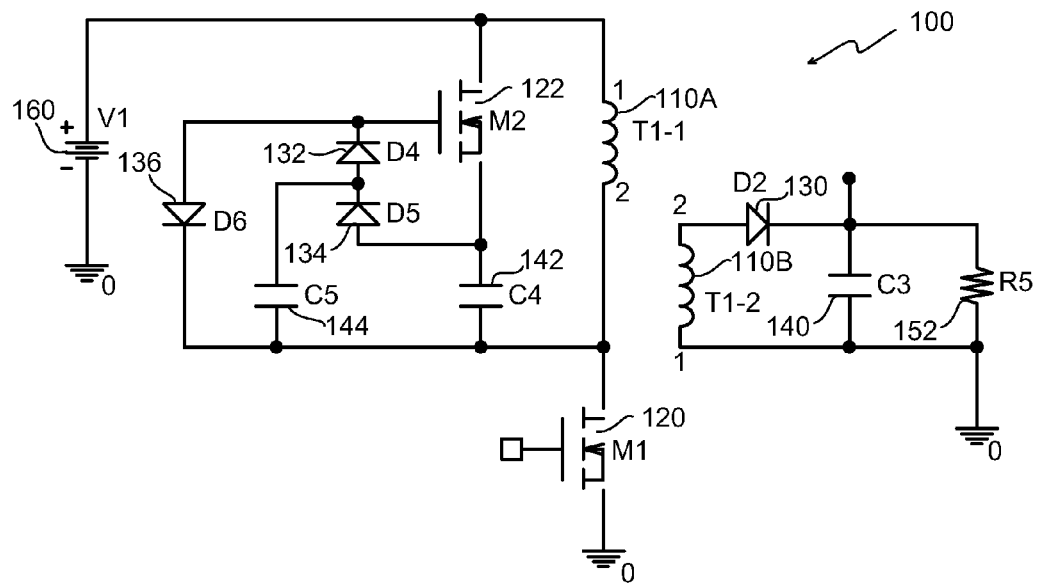
FIG. 1 is a schematic diagram of one embodiment of a prior transition mode power converter.

As can be seen by comparing FIG. 2 with FIG. 1, the power converter 200 has the snubber capacitor (C4) 242 and the auxiliary MOSFET (M2) 222 as with the power converter of FIG. 1, but the series capacitor (C5) and the switch diodes (D4-D6) of the power converter 100 shown in FIG. 1 are eliminated and instead the auxiliary winding (T1-3) 210C is used to control the gate of the auxiliary switch MOSFET (M2) 122 and the zener diode (232) and resistor (R1) 250 are used to clamp the negative voltage that applies on the gate terminal of auxiliary switch MOSFET (M2) 222 when the primary switch MOSFET (M1) 220 is on.

In operation, the power converter 200 uses the auxiliary winding (T1-3) 210C of transformer 200 to get the reflected secondary voltage to drive the auxiliary MOSFET (M2) 222. Because the reflected voltage on the auxiliary winding is proportional to the secondary main output voltage, the gate voltage is regulated since the main output voltage is regulated. Thus, the voltage variation on the auxiliary switch's gate (the gate terminal of auxiliary MOSFET (M2) 222) is much less than in the power converter 100 of FIG. 1. This enables higher power application for the power converter 200 of FIG. 2.

Controlling operation of the auxiliary switch (e.g., MOSFET (M2) 122) using an auxiliary winding is not limited to a power converter configured the same as the power converter 200 of FIG. 2. In this regard, the present invention's concept of using an auxiliary winding on the transformer to control operation of an auxiliary switch in a power converter may, for example, be applied to boost, buck/boost, and/or flyback power converter technologies that operate in transition mode. Additionally, in some power converter applications, the clamping circuit (resistor (R1) 250 and zener diode (D3) 232) may not be needed. In this regard, FIG. 3 shows a schematic diagram of a power converter 300 in which the auxiliary switch (MOSFET (M2) 122) is controlled by the auxiliary winding 210C connected across the second and third (source and gate) terminals of the auxiliary switch 122 without any clamping circuitry.

Figure 3:
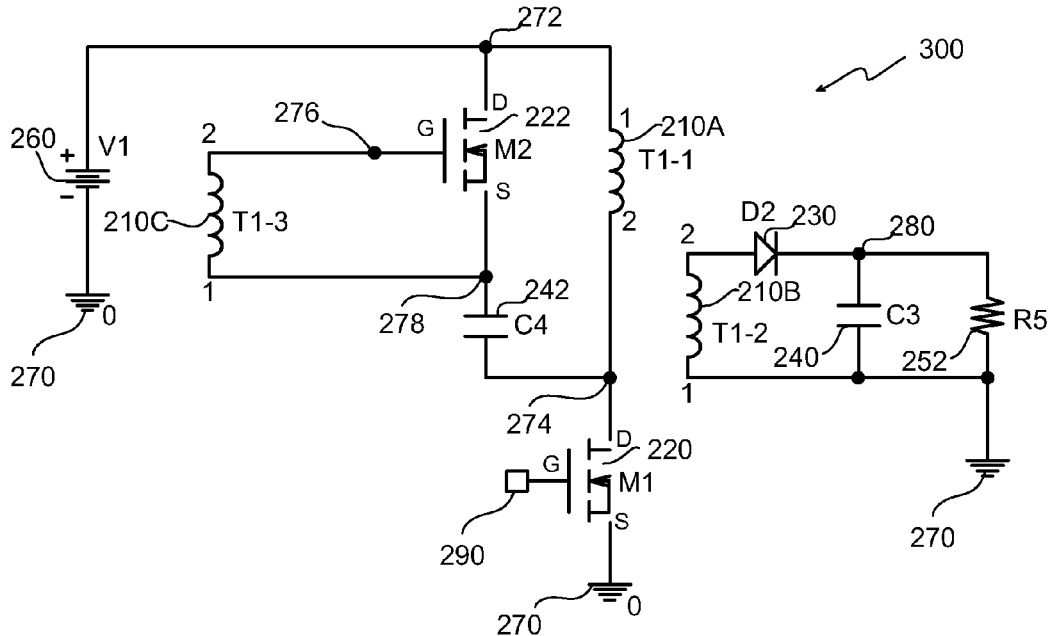
FIG. 3 is a schematic diagram of another embodiment of a transition mode power converter in accordance with the present invention.
Figure 4:
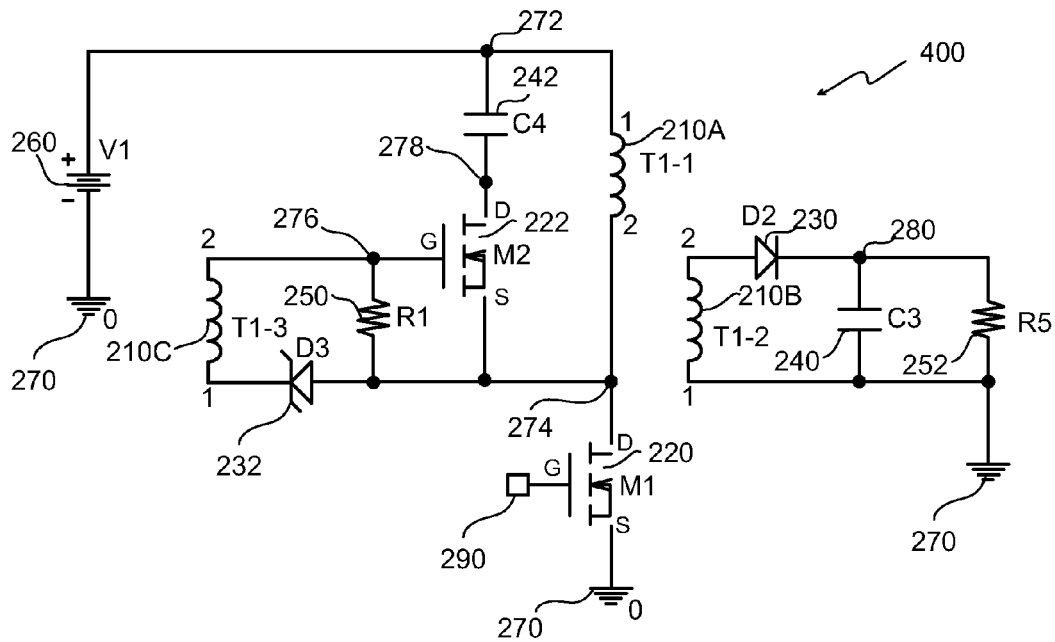
FIG. 4 is a schematic diagram of a further embodiment of a transition mode power converter in accordance with the present invention.

It is also possible to change the location of one or more components within power converters 200, 300 such as depicted in FIGS. 2 and 3 without altering the suitability of the power converters for various applications. For example, FIG. 4 is a schematic diagram showing an embodiment of a transition mode power converter 400 similar to that of FIG. 2 but with the locations of snubber capacitor (C4) 242 and auxiliary MOSFET (M2) 222 switched. In this regard, snubber capacitor (C4) 242 is connected at node 272 with voltage source 260 and primary winding 210A. The drain terminal of auxiliary MOSFET (M2) 222 is connected to the snubber capacitor (C4) 242 at node 278 and the source terminal of auxiliary MOSFET (M2) 222 is connected at node 274 with the primary winding 210A and the drain terminal of primary MOSFET (M1) 270. Circuitry associated with controlling operation of auxiliary MOSFET (M2) 222 moves with auxiliary MOSFET (M2) 222. In this regard, auxiliary winding 210C is connected at node 276 to the gate terminal of auxiliary MOSFET (M2) 222 to control switching operation of auxiliary MOSFET (M2) 222. Zener diode (D3) 232 is connected between auxiliary winding 210C and node 274 and resistor (R1) 250 is connected between nodes 276 and 274 in parallel with the series combination of auxiliary winding 210C and zener diode 232. Although not shown in FIG. 4, in embodiments without clamping circuitry (e.g., zener diode (D3) 232 and resistor (R1) 250), auxiliary winding 210C would be connected directly at node 274 to the source terminal of the auxiliary MOSFET (M2) 222, the primary winding 210A and the drain terminal of primary MOSFET (M1) 220.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A power converter comprising:
   a transformer having a primary winding, wherein said primary winding is connected with a voltage source;
   a primary switch having a first terminal thereof connected to said primary winding of said transformer and a second terminal thereof connected to a common node;
   an auxiliary switch having a first terminal thereof connected to the voltage source and to said primary winding;
   a capacitor connected between a second terminal of said auxiliary switch and the first terminal of said primary switch;
   an auxiliary winding of said transformer connected to a third terminal of said auxiliary switch, wherein said auxiliary winding controls operation of said auxiliary switch via said third terminal; and
   a clamping circuit connected to said third terminal of said auxiliary switch.

2. The power converter of claim 1 wherein said clamping circuit comprises:
   a diode connected in series with said auxiliary winding between said auxiliary winding and said second terminal of said auxiliary switch; and
   a resistor connected in parallel with the series combination of said auxiliary winding and said diode across the second and third terminals of said auxiliary switch.

3. The power converter of claim 2 wherein said diode comprises a zener diode.

4. The power converter of circuit of claim 1 further comprising:
   a secondary winding on said transformer, wherein said secondary winding is connected to said common node;
   a secondary side diode connected to said secondary winding of said transformer;
   a secondary side capacitor connected between said diode and said common node; and
   a secondary side resistor connected in parallel with said capacitor between said diode and said common node.

5. The power converter of claim 1 wherein said primary switch comprises a transistor.

6. The power converter of claim 5 wherein said transistor comprises a field effect transistor and wherein the first terminal of said transistor comprises a drain terminal and wherein said second terminal comprises a source terminal.

7. The power converter of claim 1 wherein said auxiliary switch comprises a transistor.

8. The power converter of claim 7 wherein said transistor comprises a field effect transistor and wherein the first terminal of said auxiliary transistor comprises a drain terminal, wherein said second terminal comprises a source terminal, and wherein said third terminal comprises a gate terminal.

9. The power converter of claim 1 further comprising control circuitry connected to a third terminal of said primary switch, wherein said control circuitry controls operation of said primary switch via said third terminal.

10. The power converter of claim 1, wherein said clamping circuit prevents a negative voltage from being applied to said third terminal of said auxiliary switch.

11. A power converter comprising:
transforming means for transforming an input voltage level from a voltage source to a different output voltage level, said means for transforming including a primary side connected to said voltage source and an auxiliary side;
primary switching means for switching between an on and an off state, said primary switching means having first, second and third terminals, wherein said first terminal thereof is connected to said primary side of said transforming means, and wherein said second terminal thereof is connected to a common node;
auxiliary switching means for switching between an on and an off state, said auxiliary switching means having first, second and third terminals, wherein said first terminal thereof is connected to said voltage source and to said primary side of said transforming means, and wherein said third terminal thereof is connected to said auxiliary side of said transforming means;
charge storing means connected between the second terminal of said auxiliary switching means and the first terminal of said primary switching means; and
a clamping means connected to said third terminal of said secondary switching means;
wherein a reflected voltage in said auxiliary side of said transforming means controls switching of said auxiliary switching means between the on and off states thereof.

12. The power converter of claim 11 wherein said clamping means comprise:
current blocking means connected between said auxiliary side said of said transforming means and said second terminal of said auxiliary switching means; and
current resistance means connected in parallel with the series combination of said auxiliary side of transforming means and said current blocking means across the second and third terminals of said auxiliary switching means.

13. The power converter of claim 12 wherein said current blocking means comprise a zener diode and wherein said current resistance means comprise a resistor.

14. The power converter of claim 11 wherein said transforming means comprise a transformer and wherein said primary side comprises a primary winding of said transformer and said auxiliary side comprises an auxiliary winding of said transformer.

15. The power converter of claim 11 wherein said primary switching means comprise a transistor.

16. The power converter of claim 15 wherein said transistor comprises a field effect transistor and wherein said first terminal thereof comprises a drain terminal and said second terminal thereof comprises a source terminal.

17. The power converter of claim 11 wherein said auxiliary switching means comprise a transistor.

18. The power converter of claim 17 wherein said transistor comprises a field effect transistor and wherein said first terminal thereof comprises a drain terminal, said second terminal thereof comprises a source terminal, and said third terminal thereof comprises a gate terminal.

19. The power converter of claim 11 wherein said charge storing means comprise a capacitor.

20. The power converter of claim 11 further comprising:
a secondary side of said transforming means;
secondary side current blocking means connected to said secondary side of said transforming means;
secondary side charge storing means connected between said secondary side current blocking means and said common node; and
secondary side resistance means connected in parallel with said secondary side charge storing means between said secondary side current blocking means and said common node.

21. The power converter of claim 20 wherein said transforming means comprise a transformer, said primary side of said transforming means comprise a primary winding of said transformer, said auxiliary side of said transforming means comprise an auxiliary winding of said transformer, said secondary side of said transforming means comprise a secondary winding of said transformer, said secondary side current blocking means comprise a diode, said secondary side charge storing means comprise a capacitor, and said secondary side current resistance means comprise a resistor.

22. The power converter of claim 11, wherein said clamping means prevents a negative voltage from being applied to said third terminal of said secondary switching means.

23. An active snubber circuit for a power converter that includes a transformer and a primary switch, the transformer including at least a primary winding connected to a voltage source, the primary switch being connected to the primary winding, said circuit comprising:
an auxiliary switch;
a capacitor connected in series with the auxiliary switch, wherein the series combination of said auxiliary switch and said capacitor are connected in parallel with the primary winding;
a clamping circuit connected to said auxiliary switch; and
an auxiliary winding on the transformer, wherein said auxiliary winding controls operation of the auxiliary switch between an on and an off state thereof.

24. The circuit of claim 23 wherein said clamping circuit comprises:
a diode connected in series with said auxiliary winding; and
a resistor connected in parallel with the series combination of said auxiliary winding and said diode.

25. The circuit of claim 24 wherein said diode comprises a zener diode.

26. The circuit of claim 23 wherein said primary switch comprises a transistor.

27. The circuit of claim 23 wherein said auxiliary switch comprises a transistor.

28. The circuit of claim 23 wherein power converter comprises a flyback converter.

29. The circuit of claim 23 wherein power converter comprises a boost converter.

30. The circuit of claim 23 wherein power converter comprises a buck/boost converter.

31. The circuit of claim 23, wherein said clamping circuit prevents a negative voltage from being applied to said auxiliary switch.

* * * * *

UNITED STATES PATENT AND TRADEMARK OFFICE
CERTIFICATE OF CORRECTION

PATENT NO.       : 8,000,112 B2                                              Page 1 of 1
APPLICATION NO.  : 12/101700
DATED            : August 16, 2011
INVENTOR(S)      : Zhang It is certified that error appears in the above-identified patent and that said Letters Patent is hereby corrected as shown below:

Column 2, line 41, delete "on" and insert therefor --one--.
Column 4, line 9, after "types", insert --of--.
Column 8, line 53, after "wherein", insert --said--.
Column 8, line 55, after "wherein", insert --said--.
Column 8, line 57, after "wherein", insert --said--.

Signed and Sealed this
Twenty-seventh Day of September, 2011

David J. Kappos
*Director of the United States Patent and Trademark Office*